(12) United States Patent
Schanin

(10) Patent No.: US 6,243,626 B1
(45) Date of Patent: Jun. 5, 2001

(54) EXTERNAL POWER MANAGEMENT DEVICE WITH CURRENT MONITORING PRECLUDING SHUTDOWN DURING HIGH CURRENT

(75) Inventor: David J. Schanin, San Carlos, CA (US)

(73) Assignee: Bayview Technology Group, Inc., San Carlos, CA (US)

( * ) Notice: Subject to any disclaimer, the term of this patent is extended or adjusted under 35 U.S.C. 154(b) by 0 days.

(21) Appl. No.: 09/182,586

(22) Filed: Oct. 28, 1998

(51) Int. Cl.[7] .................................................. G05D 11/00
(52) U.S. Cl. ............................................. 700/286; 700/296
(58) Field of Search ....................................... 700/286, 298

(56) References Cited

U.S. PATENT DOCUMENTS

| | | | |
|---|---|---|---|
| 4,752,853 | * | 6/1988 | Matsko et al. .......................... 361/94 |
| 5,475,609 | * | 12/1995 | Apothaker ............................. 700/292 |
| 5,574,653 | * | 11/1996 | Coomer et al. ........................ 700/286 |
| 5,625,236 | * | 4/1997 | Lefebvre et al. ....................... 307/41 |
| 5,675,503 | * | 10/1997 | Moe et al. ............................ 700/296 |
| 5,696,695 | * | 12/1997 | Ehlers et al. .......................... 700/286 |
| 5,739,596 | * | 4/1998 | Takizawa et al. ...................... 307/66 |
| 5,761,083 | * | 6/1998 | Brown, Jr. et al. .................... 700/296 |
| 5,943,246 | * | 8/1999 | Porter ................................... 307/43 |
| 5,962,989 | * | 10/1999 | Baker ................................... 315/294 |
| 6,104,968 | * | 8/2000 | Ananth ................................. 700/297 |
| 6,112,135 | * | 8/2000 | Peterson et al. ....................... 700/293 |

* cited by examiner

Primary Examiner—William Grant
Assistant Examiner—Zoila Cabrera
(74) Attorney, Agent, or Firm—Clifton L. Anderson

(57) ABSTRACT

An external power-management device controls the supply of electric power from a wall outlet to a refrigerated vending machine. The system includes a switch that couples power in an ON condition and decouples in an OFF condition. The switch is controlled by a controller based on data received from a current sensor, an occupancy sensor, a temperature sensor, and a time-of-year circuit. Upon startup, the current is monitored to determine maxima and minima for the vending machine. The system supplies power to the appliance during business hours as indicated by the time-of-year circuit and while the vicinity is occupied as determined by the occupancy sensor irrespective of the values for current and temperature. Absent the current sensor, the power would be decoupled after a predetermined duration of non-occupancy during nonbusiness hours. However, if the current sensor indicates a high (relative to the previously determined minima and maxima) current at the proposed shutdown time, shutdown is aborted to avoid interruption of a compression (cooling) cycle initiated by the vending machine. The temperature is used in determining when, after shutdown, power is resumed to permit vending machine contents to be cooled.

17 Claims, 2 Drawing Sheets

*Figure* 1

EXTERNAL POWER MANAGEMENT DEVICE WITH CURRENT MONITORING PRECLUDING SHUTDOWN DURING HIGH CURRENT

BACKGROUND OF THE INVENTION

The present invention relates to electrical systems and, more particularly, to electrical systems for reducing power consumption by electrical appliances. A major objective of the present invention is to reduce the power consumption of an appliance by withholding power over time periods selected to minimize interference with the usefulness of the appliance.

Despite an increasing awareness of the importance of energy conservation, the demand for electrical power has been increasing; this increase is due, in large part, to the increasing prevalence of computers and power-hungry peripherals such as laser printers. In many cases, the appliances collectively draw more power than the building in which they are housed was designed to manage. Options such as rewiring a building and moving into another building are expensive. Thus, both economic and conservation considerations place a premium on limiting power consumption.

Many appliances are now designed to minimize power consumption. In part, this is accomplished by including intelligent power management capabilities. For example, many devices turn off or enter a very-low-power sleep mode after a certain lapse of time without use. However, many legacy appliances and even some recently available appliances do not employ effective power management.

Moreover, many devices that do incorporate power management do not do so optimally. For example, many devices power down after a predetermined period of non-use. In many cases, appliances that shut down during business hours or when a potential user is in the vicinity incur a cost, whether in lost revenues or in productivity, e.g., in the case of a copy machine that forces users to wait while it warms up.

Appliances with less-than-optimal power management call for add-on devices that reduce power consumption by turning off power to the appliance during periods of nonuse. A typical external power-management device is designed to be plugged into a wall outlet and includes its own outlet into which the appliance is plugged. A switch internal to the power-management device determines whether or not the appliance is coupled electrically to the wall outlet.

Such external power management faces challenges beyond those faced by internal power management. Appliances are designed to detect certain inputs and to initiate certain actions; thus, the appliances are "informed" when the inputs and actions occur. However, such appliances do not, in general, make such information available to external devices. Also, in general, such information is not easily accessed or duplicated by external devices. Thus, it can be difficult to design an external power-management device that determines shutdown based on usage and internal activity as effectively as an appliance designed from the outset to address power management.

Some external power-management devices incorporate occupancy detectors to address the lack of direct usage data. An appliance is more likely to be being used or to be about to be used if there is a person in its vicinity. Occupancy is relatively useful for determining when to power on an appliance. For example, security lights often use occupancy sensing (motion detection); lights are turned on when motion is sensed. Typically, security lights are turned off after a predetermined elapsed time during which no motion is detected. Occupancy sensing can be coupled with other forms of sensing; for example, security lights often monitor ambient light and preclude activating the lights when the ambient light is ample.

Occupancy is not as useful when it comes to determining a shutdown time for appliances that can be remotely activated (e.g., a networked printer) and for appliances that undergo self-initiated procedures (e.g., a vending machine compression cycle) that should not be interrupted. While information about remote activation and internal cycling is available to the appliance, it is not, in general, available to an external power-management device. What is needed is an external power-management device that provides a better tradeoff between power conservation and convenience.

SUMMARY OF THE INVENTION

The present invention provides an external power-management device that monitors current to the appliance being managed. The external power-management device controls the connection between the appliance and a power source (e.g., a wall outlet). Since the current through the external power-management device corresponds to the current to the appliance, the appliance current can be conveniently monitored by the external-power-management device.

Most appliances draw more current during usage. Thus, monitoring current is one way of monitoring usage. Also, many appliances draw more current during procedures (such as compression cycles for refrigerated vending machines) that should not be interrupted by suddenly decoupling power. Thus, current monitoring can be used to preclude shutdown during procedures that should not be interrupted.

More intelligent power management can be achieved by monitoring other parameters along with current. For example, the system can include a time-of-year circuit. The time of the year (day of the year and the time of day) can be monitored to preclude shutdown during "business hours" and/or to force appliance activation at the start of a business day.

Occupancy can be monitored to provide data on potential usage. Occupancy provides a suitable complement to current in that it is useful for determining when to connect an appliance to power. However, occupancy can also be used in conjunction with current to determine when to shutdown. Temperature can be monitored and used, for example, to determine how long an appliance should be shutdown. For example, if the temperature is high, a shorter shutdown might be programmed to preserve perishable vending machine contents.

Current data can be used in a variety of ways depending on the other parameters, if any, being monitored, and the type of appliance. The current data can be used simply to preclude shutdown during high current load indicating usage or a special appliance cycle. For example, shutdown can be precluded while the current is above a certain threshold. In this case, the high current can be used to preclude initiation or to abort a shutdown countdown. To provide hysteresis, a low threshold can be used to activate a countdown, while a high threshold can be used to preclude or abort the countdown.

The current data can be used to set the thresholds automatically. For example, a controller can keep track of the current maxima and minima over time. The thresholds can be calculated as a function of the maxima and minima currents. Thus, the current can be used both to set current thresholds and as a direct factor in determining when shutdown is to occur. These and other features and advantages of the present invention are apparent from the description below with reference to the following drawings.

DESCRIPTION OF THE PREFERRED EMBODIMENTS

Figure 1:
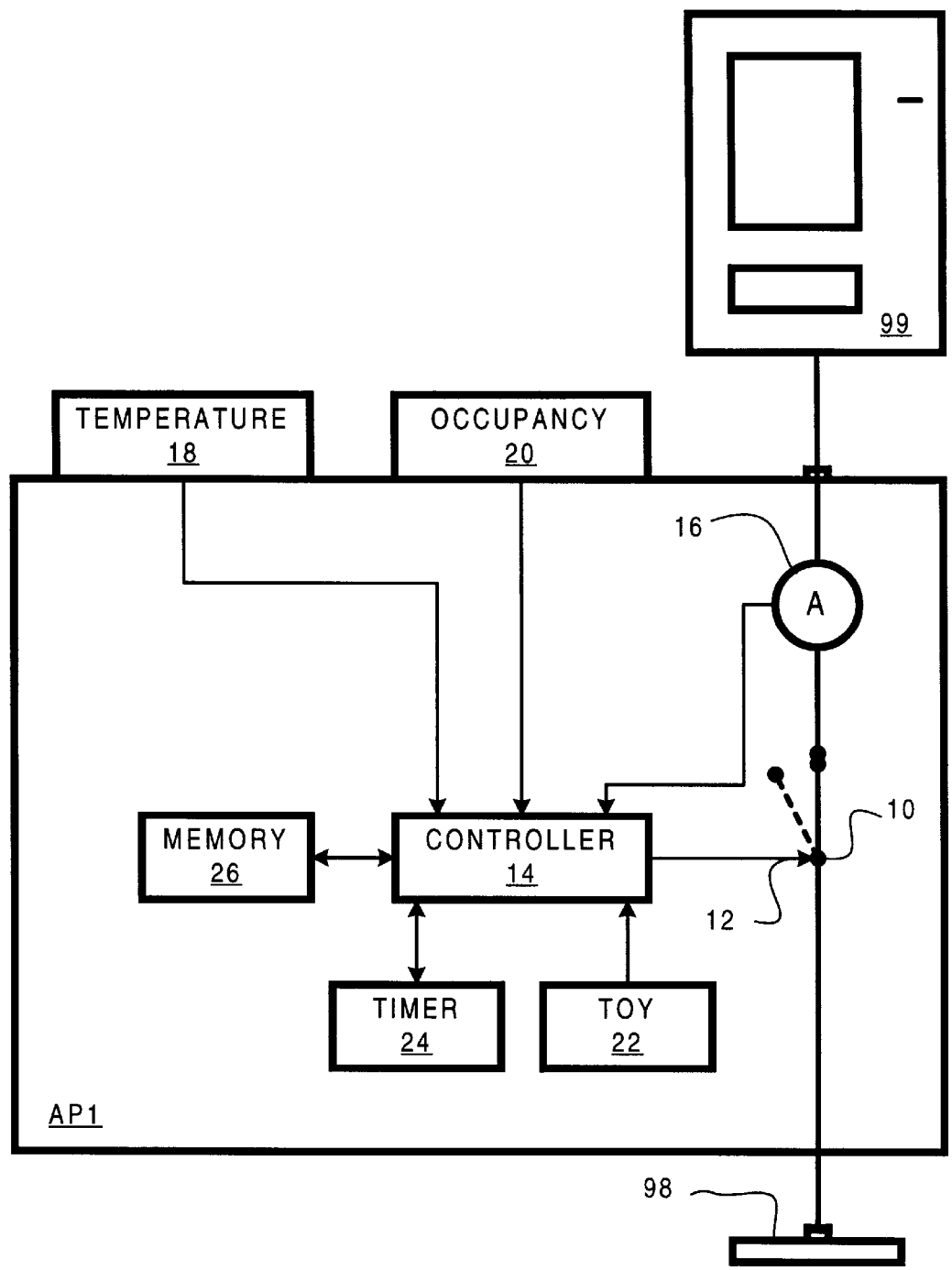
FIG. 1 is a schematic illustration of an external power-management device in accordance with the present invention controlling the coupling of an appliance to a power source.

An external power-management device AP1 in accordance with the present invention is disposed electrically between a wall socket 98 and an vending machine 99, as shown in FIG. 1. System AP1 includes a switch 10 that, when in its "ON" condition, electrically couples a refrigerated vending machine 99 to wall socket 98, which serves as a power source; in its "OFF" condition, indicated in dash in FIG. 1, switch 10 causes vending machine 99 to be decoupled electrically from wall socket 98.

Power switch 10 has a control input 12 that is coupled to a controller 14. Controller 14 controls when switch 10 is in its ON condition and when it is in its OFF condition via its connection to control input 12. Controller 14 determines the appropriate condition for switch 10 at any given time as a function of present and past readings from a current sensor 16, a temperature sensor 18, an occupancy sensor 20, and a time-of-year circuit 22 (an absolute time sensor). In addition, system AP1 includes a timer 24 for elapsed time indications and a random-access memory 26 for storing data for use by controller 14. Thus, each of these devices is coupled to controller 14 so as to provide respective parameters readings thereto.

Alternative embodiments of the invention include a current sensor but omit one or more of temperature sensor 18, occupancy sensor 20, time-of-year circuit 22. Also, some embodiments including a time-of-year circuit use it for providing data from which a controller calculates elapsed time, thus dispensing with the need for a separate timer circuit.

Figure 2:
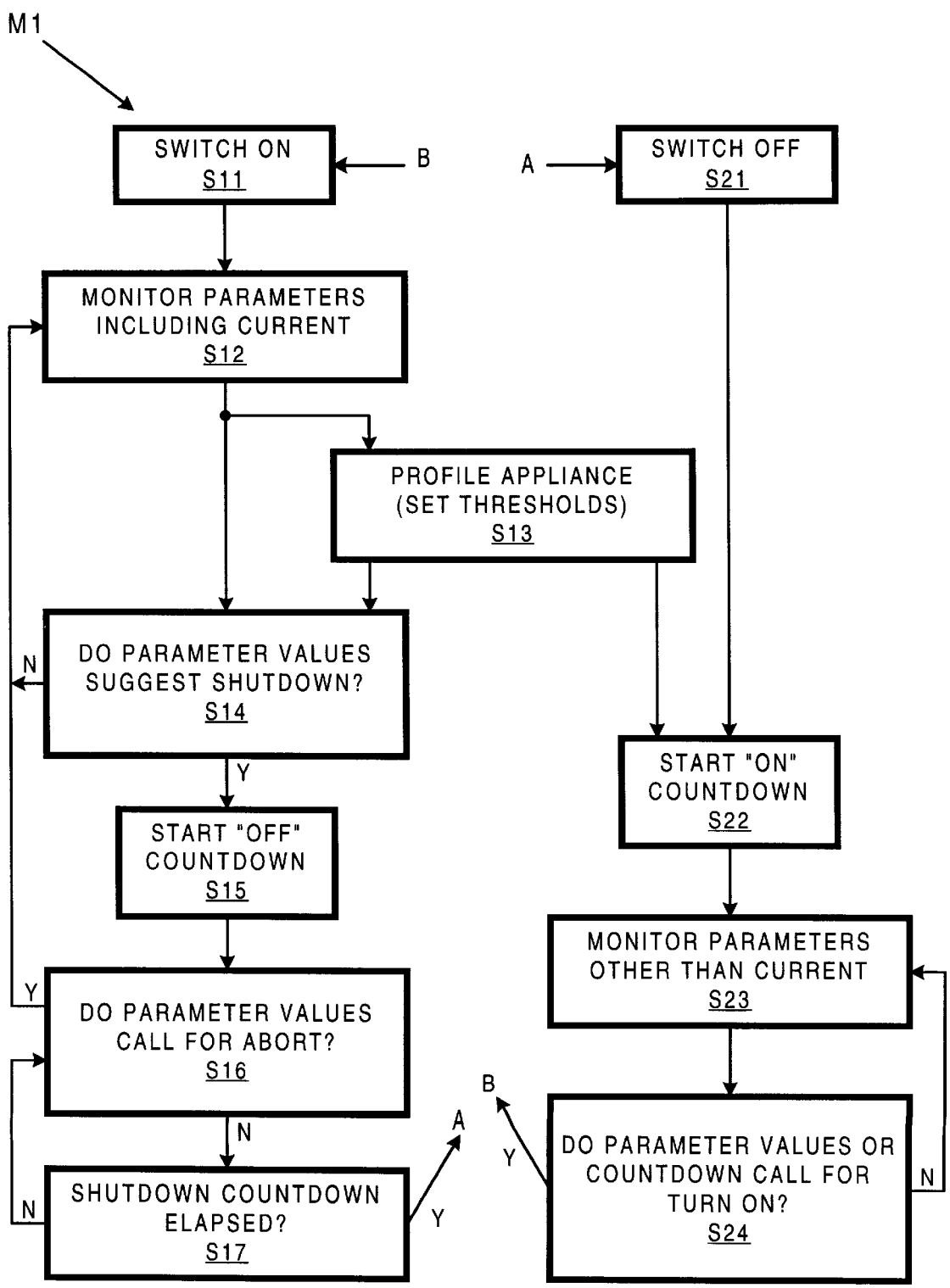
FIG. 2 is a flow chart of a power-management method in accordance with the present invention and practiced in the context of the external power-management device of FIG. 1.

A method M1 implemented by system AP1 is flow charted in FIG. 2.

In a step S11, switch 10 is placed in its ON condition so that power is supplied from outlet 98 to vending machine 99. At step S12, current, temperature, occupancy, and absolute time parameters are monitored. The monitoring is ongoing even as subsequent steps are performed.

Data collected in monitoring step S12 is used to profile vending machine 99 at step S13. For example, current minima and maxima are recorded and stored by controller 14 in memory 26. Current thresholds are calculated by controller 14 as a function of the minima and maxima and are also stored in memory 26.

These thresholds are used to determine whether or not a shutdown is in order. Specifically, a low threshold is calculated that indicates that the vending machine is not being used and is not in a compression cycle. A high threshold is calculated to indicated when vending machine 99 is in use or in a compression cycle. Between the high and low thresholds is an indeterminate or transition range that introduces hysteresis into the determination of when to remove power from vending machine 99.

In addition, the duty cycles of current peaks associated with compression cycles are collected and are correlated with temperature. This data can be used to determine a maximum shutdown time for vending machine 99. For example, if the compression duty cycle were very high before shutdown, vending machine 99 should be reactivated occasionally to cool its contents. The shutdown time can be modified as a function of temperature changes since shutdown. For example, if the ambient temperature falls after shutdown, the shutdown time can be extended.

Once sufficient data has been collected to form an initial profile, the monitor data can be used to determine at step S14 when to shut down vending machine 99. If the current is high (indicated usage or a compression cycle), if occupancy is positive, or if the absolute time is during business hours, vending machine 99 is not shutdown. In this case, method M1 returns to monitoring step S12.

If at step S14, the current is below the low threshold, occupancy is negative, and the time-of-year is off hours, then timer 24 is set for a probationary period of half an hour at step S15. During this probationary period, the present values of the parameters are evaluated at step S16 to determine whether any parameter changes to a value indicating that shutdown is not appropriate. If there is such a change, the countdown is aborted and method M1 returns to monitoring step S12. More specifically, if current exceeds the upper threshold, occupancy becomes positive, or the time-of-year becomes business hours, the probationary countdown is aborted.

As long as the parameter values are within the range for which shutdown is appropriate, the elapsed time is checked at step S17. If the countdown has not elapsed, method M1 returns to evaluation step S16. If all parameters continuously indicate that a shutdown is in order at repeated iterations of step S16 and if at one iteration of step S17 an indication is received that the probationary period has elapsed, then method M1 jumps to step S21 at which controller 14 forces switch 10 to its OFF condition, shutting down vending machine 99. An alternative to the illustrated method is simply to delay shutdown until the current goes low.

Method M1 provides for a step S22 of setting timer 24 to a countdown period; when this countdown period elapses, switch 10 is set to its ON condition (if it is not already ON) so that power is supplied to appliance 99. For example, either long compression cycles just prior to shutdown or a high ambient temperature during shutdown may call for vending machine 99 to be powered on so that the contents can be cooled. The shutdown period can be calculated by controller 14 based on profile data collected at step S13. If such action is not necessary, timer 24 is not activated at step S22.

During shutdown, parameters other than current are monitored at step S23. If at step S24 it is found that the parameter values call for activating vending machine 99, method M1 jumps to step S11 and switch 10 is set in its ON condition. Otherwise, method M1 returns to S23 and continues to monitor parameters other than current.

In step S24, a positive occupancy can cause activation. Also, a time-of-day transition into business hours can cause activation. Finally, an increase in temperature to a level requiring cooling of contents can cause activation.

By monitoring current, the present invention provides access to information about the appliance that can permit more intelligent power management. For many appliances, suddenly withdrawing power during a period of high current use is undesirable, whether the high current is due to usage or a internally initiated procedure. The data regarding variation of current over time can be used to profile the appliance in a number of ways.

Information can be gathered regarding peak and minimum currents so that the power-management device can autocalibrate. In addition, the duration of the maxima minima can be used to provide a duty-cycle characterization of the appliance—as in the case above with the compression duty cycle. Furthermore, changes in the maxima and minima over time can be used to analyze the appliance in different conditions. For example, a full vending machine may have longer compression cycles than a nearly-empty vending machine. Such information can be useful in determining how long an appliance can be shut down without impairing its contents.

The invention requires a current sensor and some means of keeping track of elapsed time. Depending on the appliance type to be managed, other sensors, such as those for temperature and occupancy can be useful additions. Where a time-of-year circuit is used to indicate business hours, the data it provides can be used to compute elapsed time; in this case a separate timer for elapsed time is not required.

In the illustrated example, the power-management device is used with a vending machine. The invention applies more generally to appliances that vary the current they draw in accordance with internal activity. Most electro-mechanical appliances are in this category.

The present invention is most beneficial when used with appliances without built in power management. Appliances with built-in power management have much more reliable sources of information about their internal activities than can be gleaned from monitoring current. Nonetheless, the present invention can provide benefits with such appliances when the current sensor is used in conjunction with another sensor or monitor. For example, even though a vending machine uses power efficiently, it can still be desirable to shut it down completely in off-hours. A external-power-management device with a current sensor as well as a time-of-year circuit can provide additional power savings without risking shutdown during high current activity on the part of the appliance. Similarly, the use of the current sensor with an occupancy sensor can avoid untimely interruptions of appliance activity. Other modifications to and variations upon the illustrated embodiments are provided for by the present invention, the scope of which is limited only by the following claims.

What is claimed is:

1. A system for controlling the power delivered to an appliance from a power source, said system comprising:
   a power input for electrically coupling to said power source;
   a power output for electrically coupling to said appliance;
   a switch for selectively coupling and uncoupling said power output to and from said power input, said switch having a switch control input;
   a timer for providing a shutdown-time indication, said timer having a timer output at which said shutdown-time indication is provided;
   a current sensor for providing current-level indications of current through said switch; and
   a controller for controlling said switch as a function of current and the presence said shutdown indication, said controller causing said switch to uncouple said power output from said power input when said timer has provided said shutdown-time indication provided said current sensor indicates said current is not above a predetermined upper-current threshold, said controller being coupled to said current sensor for monitoring said current, said controller being coupled to said timer control input for activating said timer and to said timer output for receiving said shutdown-time indication.

2. A system as recited in claim 1 further comprising an occupancy sensor coupled to said controller so that when said occupancy sensor indicates occupancy while said switch is decoupling said power output from said power input said controller causes said switch to couple said power output to said power input.

3. A system as recited in claim 1 further comprising a time-of-year circuit coupled to said controller so that said switch is controlled in part as a function of the time of the year.

4. A system as recited in claim 1 further comprising a temperature sensor coupled to said controller,
   said temperature sensor providing temperature indications,
   said controller, upon decoupling of said power output from said power input, setting an shutdown-time interval as a function of said temperature indications,
   said controller coupling said power output to said power input at the expiration of said shutdown-time interval.

5. A system as recited in claim 4 further comprising a time-of-year circuit coupled to said controller so that said switch is controlled in part as a function of the time of the year.

6. A method of controlling an appliance, said method comprising the steps of:
   monitoring the current drawn by said appliance;
   determining a time for a timer to indicate a shutdown time, said shutdown time being determined at least in part as a function of said current; and
   decoupling said appliance from a power source at when said shutdown time is indicated unless said current is above a predetermined high-current threshold.

7. A method as recited in claim 6 wherein said shutdown time is indicated at the end of a timer countdown, said countdown being aborted if during said countdown said current meets an abort criterion.

8. A method as recited in claim 7 wherein said countdown begins only when said current is below a low-current threshold.

9. A method as recited in claim 8 wherein said low-current threshold is determined as a function of variations in said current over time.

10. A method as recited in claim 9 wherein said countdown is aborted prior to said shutdown time when said current exceeds said high-current threshold.

11. A method as recited in claim 10 wherein said high-current threshold is determined as a function of variations in said current over time.

12. A method as recited in claim 6 further comprising a step of monitoring occupancy, and a step of, after said power has been decoupled, coupling said power source to said appliance at least in part as a function of occupancy.

13. A method as recited in claim 6 further comprising a step of monitoring time-of-year, and a step of, after said power has been decoupled, coupling said power source to said appliance at least in part as a function of time-of-year, said step of determining said start time being at least in part a function of time-of-year.

14. A method as recited in claim 6 comprising the preliminary steps of: plugging said appliance into a power control device and plugging said power-control device into an electrical outlet.

15. A method as recited in claim 6 further comprising a step of coupling said appliance to said power source when a power-on time indication is provided by said timer while said appliance is uncoupled from said power source.

16. A system as recited in claim 1 wherein said power input is physically and electrically coupled to an electrical wall outlet and said power input is physically and electrically coupled to a plug of said appliance.

17. A system as recited in claim 1 wherein said controller causes said timer to begin an elapsed-time countdown that begins when said power output is decoupled from said power input, said controller causing said switch to couple said power output to said power input when said elapsed-time countdown is complete.

* * * * *